INVENTOR
LAZAROS J. LAZARIDIS
BY Kenway, Jenney &
Hildreth
ATTORNEYS

June 6, 1972  L. J. LAZARIDIS  3,667,745
CRUCIBLE FURNACE

Filed April 15, 1970  2 Sheets-Sheet 2

INVENTOR
LAZAROS J. LAZARIDIS

BY Kenway, Jenney &
Hildreth
ATTORNEYS

United States Patent Office 3,667,745
Patented June 6, 1972

3,667,745
CRUCIBLE FURNACE
Lazaros J. Lazaridis, Lincoln, Mass., assignor to
Thermo Electron Corporation, Waltham, Mass.
Filed Apr. 15, 1970, Ser. No. 28,860
Int. Cl. F27b 14/14
U.S. Cl. 266—33 R    7 Claims

ABSTRACT OF THE DISCLOSURE

A crucible furnace for the melting of metals or other substances having high melting points which includes a refractory vessel or crucible for containing the material to be melted, the vessel being surrounded by a baffle generally conforming in shape to the vessel. External to the baffle is a chamber at the base of which fuel and combustion air, at times preheated, are separately introduced, tubulently mixed and ignited. The baffle is perforated in a pattern of holes which serve to direct combustion gases in the form of jets upon the outer wall of the vessel. This action enhances heat transfer by disrupting stagnant boundary layers of gas along the wall of the crucible, contributes to the uniformity of heat distribution in the crucible, and contributes in achieving high overall heat transfer coefficient. The products of combustion are drawn out of an annular space about the upper periphery of the crucible which is sealed so that no contact with the contents of the crucible is possible. The products of combustion may also be passed through a recuperator when preheating of the incoming combustion air is desirable to increase efficiency and flame temperature.

BACKGROUND OF THE INVENTION

Figure 1:
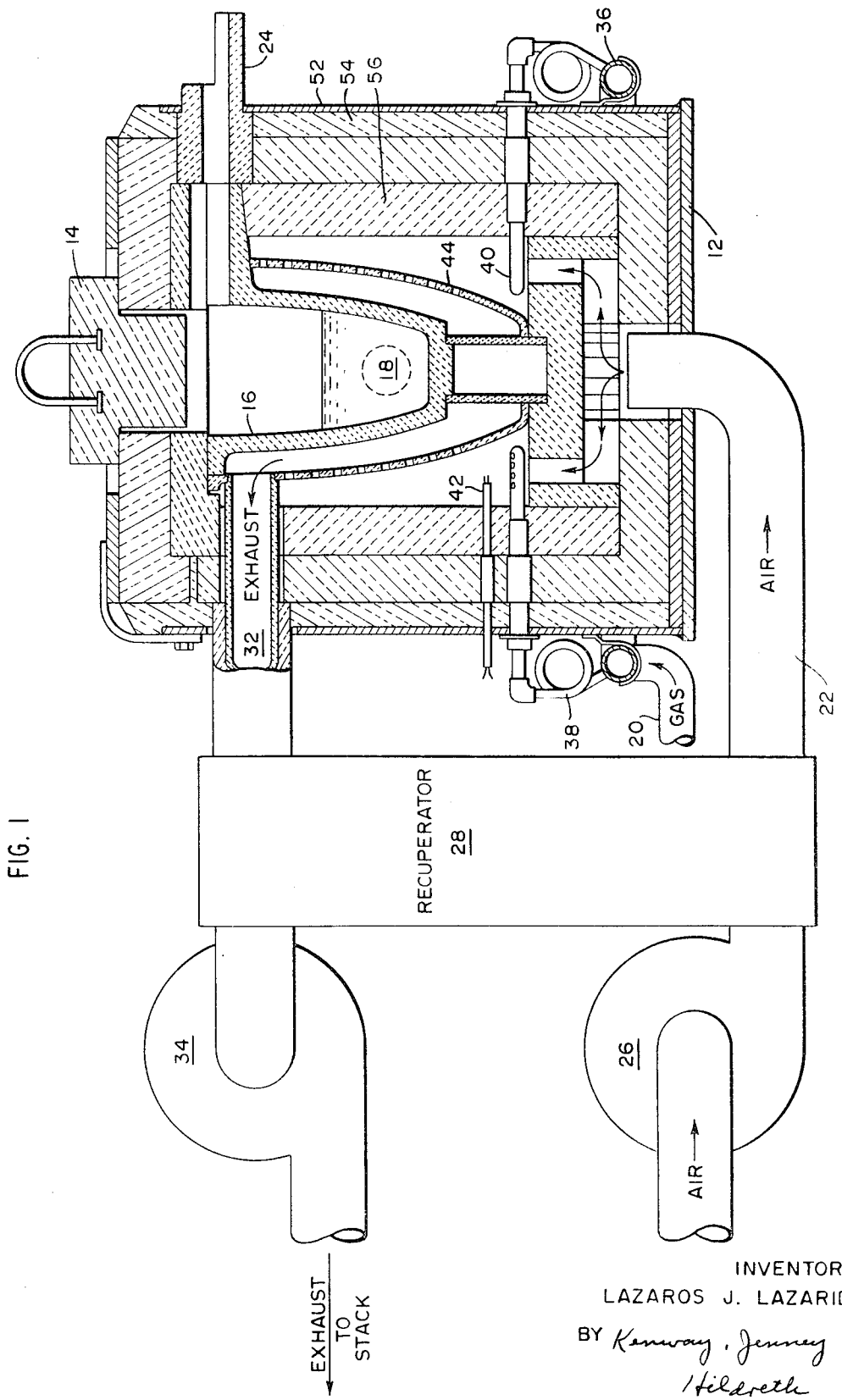

Crucible furnaces have been a necessity in the working of metals and other substances for many years. Generally the heating is done by burning liquid or gaseous fuels in combustors disposed around the periphery of the crucible in such way as to create a peripherally moving stream of combustion products around the wall of the crucible. In certain cases, and to obtain better heating rates, the products of combustion are forced to circulate over the top surface of the crucible coming in contact with the top of the melt. In the process and despite the increased heat transfer rate the combustion products also entrain volatile elements in the melt causing significant metal loss, depletion of certain alloy elements to change alloy proportions and heavily contributing to air pollution.

In situations where high purity and lack of contamination are primary considerations induction furnaces are frequently used. The majority of installations, however, utilize straight combustion heating and this is unsatisfactory for several reasons including low processing efficiency, both in terms of cost and time; loss of metal during the melting which is aggravated by low melting speeds; long warm-up time; and size and expense of the original installation. Still other drawbacks are the extremely high noise level which results from the high velocity gas streams aimed tangentally at the crucible; superheating of the surface of the melt and contamination of the melt. Finally, the environment about known gas-fired crucible furances leaves much to be desired. In addition to the high level of noise mentioned above, the failure to confine combustion gases and properly vent them externally of the building pollutes the work area and, in certain conditions as when melting magnesium and its alloys, exposes operating personnel to serious health hazards. Also, the absence of good insulation, a condition at least partly resulting from the design utilizing hot gases directed upon the melt, multiplies the hazards and discomforts of operating personnel.

SUMMARY OF THE INVENTION

Basically, the present invention has as its major objective the improvement of gas-fired crucible furnaces. Most, if not all, of the difficulties associated with known gas-fired crucible furnaces are avoided or minimized by improving heat transfer techniques by directing the combustion gases as jets upon the outer surface of the crucible pot or vessel. Also, combustion is improved by eliminating burners as such by creating a combustion volume surrounding the crucible where air and fuel are introduced in the right proportions mixed and burned. Also, the escape of flue gases into the environment of the melt or in a random way about operating personnel is avoided by utilizing, as needed, the flue gases in a recuperator to preheat the incoming combustion air; and by judiciously and effectively insulating the entire structure of the crucible furnace to keep the heat in its proper area of utilization and to minimize operating noise.

Figure 2:
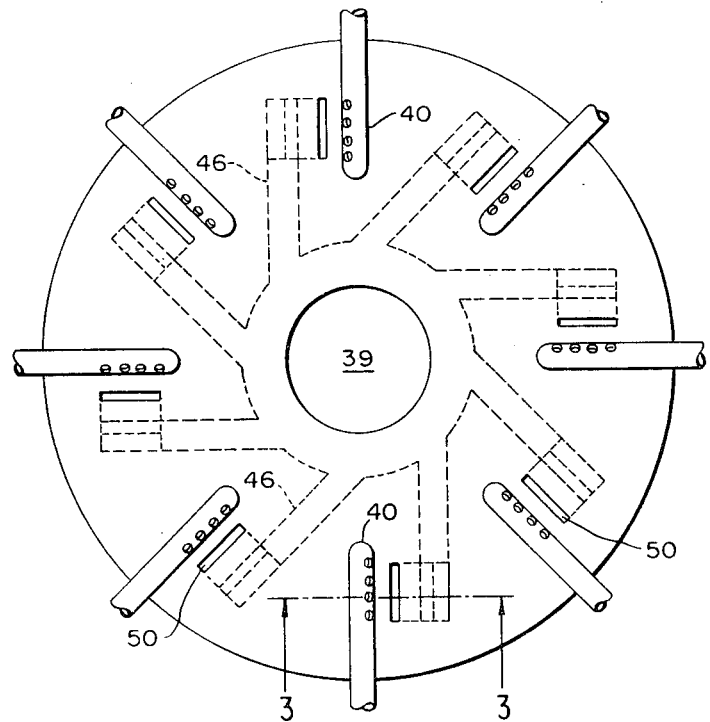
Figure 3:
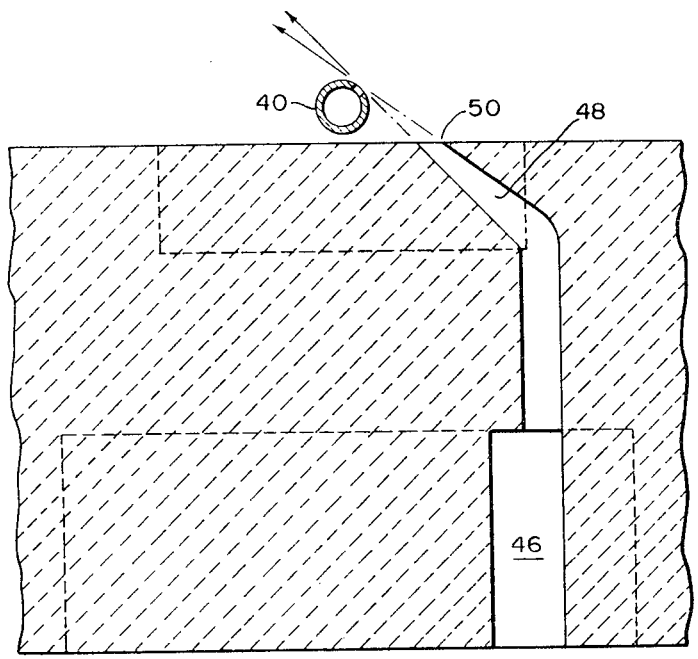

For a better understanding of the present invention, there follows a detailed description of a preferred embodiment which should be read with reference to the attached drawing in which:

FIG. 1 is a schematic view of the overall furnace system, including a sectional view of essential components of the furnace, FIG. 2 is a cross-sectional view of the mixer of the furnace, and FIG. 3 is a view in section of a portion of FIG. 2 taken along the lines 3—3.

DETAILED DESCRIPTION

The overall furnace arrangement is outlined in FIG. 1 and the operative or material-melting portion of the furnace is shown in some detail. The principal elements are contained in a cylindrical enclosure 12 having a composite wall structure which is explained in greater detail herein below. The enclosure 12 is provided with an insulated removable cap 14 by means of which an interior crucible vessel 16 may be charged with material to be melted. The crucible 16 may be arranged to be lifted from the enclosure 12 or may be so designed that the enclosure 12 may be tilted to permit the pouring of melted material. Such a pivoting arrangement is suggested at 18. An input gas line 20 and an input air line 22 may be provided with flexible sections or quick-disconnect fittings (not shown) in order that the entire enclosure 12 may be tilted for pouring. An output spout 24 passing through the enclosure wall communicates with the interior of the vessel 16 to allow molten material to be so poured.

Other major components of the furnace system include an air blower 26 which forces the combustion air into a recuperator 28 when used. If no preheating is desired air may be forced directly into a plenum 39, thence to a swirler plate and the combustion chamber. The recuperator 28 may be conventional in nature and contain a heat exchanger in which incoming air derives heat from flue gases emanating from an exhaust passage 32 and passing through the recuperator 28. The exhaust gases may be accelerated through the recuperator 28 by an exhaust pump 34 from which they are forced into a stack.

Combustion gas from the inlet line 20 is fed to a ring manifold 36 from which it is distributed through coiled lines 38, each of which is connected to a fuel injector 40 by a line passing through the wall of the enclosure 12. Air or other combustion-supporting gas from the line 22 enters the plenum 29 and is swirled by being diverted outwardly along radial passages from which it rises to the fuel injectors 40 as is explained in greater detail hereinafter.

A spark gap 42 which is electrically energized by suitable conductors passing through the wall of the enclosure 12 provides ignition. Surrounding and generally conforming in shape to the crucible vessel 16 is a baffle 44 which is perforated in a uniform pattern. Combustion gases are jetted through the openings in the baffle 44 and impinge upon the outer surface of the crucible vessel 16. The gases are ultimately driven through the exhaust or flue passage 32 after the major portion of the heat contained in the gases is transferred to the wall of the crucible and to the baffle 44 from which heat is also transferred, here by radiation, to the crucible vessel 16. Preheating of input air then takes place in the recuperator 28 in the manner outlined above.

In FIGS. 2 and 3 some detail on the combustion apparatus may be more clearly seen. Swirling action is generated in passages 46 radiating outwardly from the axial inlet. From the top outer ends of the passages 46, tapered sub-passages 48 extend to terminate in slots 50 adjacent each fuel injection head 40. The slots 50 are approximately the same length as the perforated portion of the fuel injection heads 40. Thus, a sharply defined flow of combustion air over the openings in the fuel injection head and at right angles to the direction of fuel injection is obtained.

The combustion air may, in a typical installation, be pre-heated in the recuperator 28 to a temperature of 1100° F. or higher. Such pre-heating may be achieved with a low-cost all-metallic recuperator utilizing flue gas dilution, for example. In higher temperature preheating, ceramic or silicon carbide structures similar to those disclosed in Lyczko Pat. No. 3,416,011 can be employed. The driving of the inlet air through the slots 50 over the openings in the fuel injection heads from which the gas is issuing at relatively high pressure produces a high degree of turbulence and thorough mixing.

To start combustion, the mixture is ignited at the turbulent area by the spark gap 42 and the combustion gases rise and are directed through the openings in the baffle 44 to impinge upon the exterior wall of the crucible vessel 16. The jets are of relatively high velocity, and are directed substantially at right angles upon the exterior wall of the crucible vessel 16 disrupting stagnant boundary layers along that wall which would otherwise interfere with efficient convective heat transfer. At the same time the combustion gases passing through the baffle openings achieve a substantial heat release to the baffle raising its temerature to a level from which efficient radiant heat transfer to the crucible vessel is accomplished. Thus, the overall high heat transfer coefficient achieved is a combination of radiant heat transfer from the baffle and the hot gases and from jet impingement convective heat transfer.

Crucible temperatures of 2,700° F. or higher are achieved and it has proven desirable to utilize materials for the crucible and the baffle 44 which are capable of withstanding such high temperatures. By way of example, self-bonded silicon carbide is a material which exhibits favorable physical properties.

The interior of the crucible vessel 16 is sealed from any communication with the combustion or jet-impingement heating areas with the result that the products of combustion are unable to contaminate or deplete volatile components from the melt contained in the crucible vessel. The enclosure 12 preferably includes a steel sheath 52 for structural integrity within which there may be courses of insulating fire brick 54 and 56. With such a lining of insulating fire brick, not only good insulation but long life is assured. The use of a symmetrical pattern of openings in the baffle 44 contributes to the uniform distribution of heat about the entire crucible vessel.

In a sense, the baffle 44 divides the volume about the crucible vessel 16 into two chambers. The outer, or upstream chamber is the combustion chamber and the inner, or downstream chamber, is the jet impingement chamber. The combustion chamber contains no burners, as such, fuel and air being injected and ignited in a chamber from which the products of combustion are jetted through the second chamber upon the crucible wall. Thus, high heat-up rates and a compact overall structure was provided and the melting time for a given quantity of material, as compared to the performance of known furnaces is drastically reduced.

What is claimed is:

1. A crucible furnace for high-temperature melting of material comprising a vessel for holding said material, a perforated baffle surrounding said vessel, an insulating enclosure surrounding said baffle and defining a volume divided into an inner chamber between said vessel and said baffle and an outer chamber between said insulating enclosure and said baffle, means for producing combustion gases immediately adjacent said baffle in said outer chamber, said gases passing through the openings of said perforated baffle into said inner chamber and impinging as jets upon said vessel, and an exhaust flue for removing said gases after their impingement upon said vessel, said flue being sealed against communication with the interior of said vessel.

2. A crucible furnace as defined in claim 1 wherein said means for producing combustion gases includes at least a fuel injector, means for introducing combustion-supporting gas adjacent said fuel injector, means for mixing said fuel and said combustion-supporting gas to produce a turbulent mixture, and means disposed adjacent said fuel injector for igniting said turbulent mixture to produce said combustion gases.

3. A crucible furnace for high-temperature melting of material comprising a vessel for holding said material, a perforated baffle surrounding said vessel, at least one fuel injector disposed outside said baffle, means for introducing combustion-supporting gas adjacent said fuel injector, means for mixing fuel from said fuel injector and said combustion-supporting gas to produce a turbulent mixture, means disposed adjacent said fuel injector for igniting said turbulent mixture to produce combustion gases, said gases passing through the openings of said perforated baffle to impinge as jets upon said vessel, and an exhaust flue sealed against communication with the interior of said vessel for removing said gases after their impingement upon said vessel, wherein said mixing means comprises an injector head having a plurality of openings formed therein from which said fuel emerges, and means forming a slot adjacent and comparable in length to the length of said plurality of openings formed in said injector head, said slot-forming means being a continuation of said means for introducing combustion-supporting gas, whereby a flow of combustion-supporting gas encounters said emerging fuel at right angles to produce said turbulent mixture.

4. A crucible furnace as defined in claim 1 and further including a recuperator, means connecting said flue to said recuperator whereby combustion gases flow therethrough, means for introducing combustion-supporting gas into said recuperator in heat-exchanging relationship with said combustion gases and means connecting said recuperator to said means disposed outside said baffle for producing combustion gases.

5. A crucible furnace as defined in claim 4 and further including a first blower connected to said recuperator to force said combustion-supporting gas therethrough and a second blower connected to said recuperator to draw said combustion gases therethrough.

6. A crucible furnace for high-temperature melting of material comprising a vessel for holding said material, a perforated baffle surrounding said vessel, a plurality of fuel injectors disposed outside said baffle, means for introducing combustion-supporting gas adjacent said fuel injectors, means for mixing fuel from said fuel injectors and said combustion-supporting gas to produce a turbulent mixture, means disposed adjacent said fuel injectors for igniting said turbulent mixture to produce combustion gases, said gases passing through the openings of said perforated baffle to impinge as jets upon said vessel, and an exhaust flue sealed against communication with the interior of said vessel for removing said gases after their impingement upon said vessel, wherein said means for introducing combustion-supporting gas comprises a plenum chamber for receiving said combustion-supporting gas and a plurality of radial passages extending outwardly from said plenum chamber to form said combustion-supporting gas into a plurality of streams, each of said passages terminating adjacent one of said fuel injectors.

7. A crucible furnace as defined in claim 1 wherein said outer chamber comprises a mixing and combustion chamber for the mixing of fuel and combustion-supporting gas and the generation of combustion gases, and said inner chamber comprises a heat transfer chamber for the convective jet impingement and radiant transfer of heat to said vessel.

References Cited
UNITED STATES PATENTS

| | | | |
|---|---|---|---|
| 2,296,440 | 9/1942 | Heller | 263—11 |
| 3,186,696 | 6/1965 | Hildebrand | 263—11 |
| 3,193,264 | 7/1965 | Rummel | 263—11 |
| 3,526,492 | 9/1970 | Motsch | 263—11 |

FOREIGN PATENTS

| | | | |
|---|---|---|---|
| 941,314 | 4/1956 | Germany | 266—39 |

GERALD A. DOST, Primary Examiner

U.S. Cl. X.R.

266—39; 263—11, 48